(12) United States Patent
Pandey

(10) Patent No.: US 11,038,995 B2
(45) Date of Patent: Jun. 15, 2021

(54) COMMUNICATIONS DEVICE AND METHOD OF COMMUNICATIONS

(71) Applicant: NXP B.V., Eindhoven (NL)

(72) Inventor: Sujan Pandey, Waalre (NL)

(73) Assignee: NXP B.V., Eindhoven (NL)

( * ) Notice: Subject to any disclaimer, the term of this patent is extended or adjusted under 35 U.S.C. 154(b) by 31 days.

(21) Appl. No.: 16/593,762

(22) Filed: Oct. 4, 2019

(65) Prior Publication Data
US 2021/0105346 A1    Apr. 8, 2021

(51) Int. Cl.
*H04L 29/06* (2006.01)
*H04L 29/08* (2006.01)
*H04L 1/00* (2006.01)

(52) U.S. Cl.
CPC .......... *H04L 69/324* (2013.01); *H04L 1/0043* (2013.01); *H04L 1/0061* (2013.01); *H04L 1/0072* (2013.01); *H04L 69/18* (2013.01)

(58) Field of Classification Search
USPC ........................................................ 370/474
See application file for complete search history.

(56) References Cited

U.S. PATENT DOCUMENTS

| | | | | |
|---|---|---|---|---|
| 2005/0238008 A1* | 10/2005 | Fraser | .................. | H04L 65/608 370/389 |
| 2006/0013225 A1* | 1/2006 | Haywood | ........... | H04L 12/4641 370/389 |
| 2007/0162610 A1* | 7/2007 | Un | ........................ | H04W 80/02 709/230 |
| 2008/0069148 A1* | 3/2008 | Wu | ....................... | H04L 69/161 370/498 |
| 2008/0095168 A1* | 4/2008 | Frazier | ................. | H04L 1/0072 370/394 |
| 2009/0177941 A1* | 7/2009 | Wager | ................... | H04L 1/0061 714/752 |
| 2009/0259925 A1* | 10/2009 | Balasubramanian | .. | H04H 60/79 714/807 |
| 2009/0307557 A1* | 12/2009 | Rao | ...................... | H04L 1/1874 714/749 |
| 2010/0061324 A1* | 3/2010 | Liao | .................... | H04W 72/042 370/329 |
| 2010/0202392 A1* | 8/2010 | Zhang | .................. | H04W 52/48 370/329 |
| 2012/0287772 A1* | 11/2012 | Wan | ....................... | H04L 12/40 370/216 |
| 2014/0277764 A1* | 9/2014 | Burt | ....................... | G05B 15/02 700/276 |

* cited by examiner

Primary Examiner — Robert J Lopata
(74) Attorney, Agent, or Firm — Rajeev Madnawat

(57) ABSTRACT

Embodiments of a device and method are disclosed. In an embodiment, a method of communications involves determining a characteristic of a header or a payload, generating an error control code for the header or for the header and the payload based on the characteristic of the header or the payload, and attaching the error control code to the header and the payload to form a data packet for communications in a wired communications network.

20 Claims, 13 Drawing Sheets

| PROTOCOL TYPE | HEADER | HEADER + PAYLOAD |
|---|---|---|
| PROTOCOL_1 | X | |
| PROTOCOL_2 | | X |
| PROTOCOL_3 | | X |
| PROTOCOL_4 | X | |

FIG. 7

COMMUNICATIONS DEVICE AND METHOD OF COMMUNICATIONS

BACKGROUND

In a communications network with limited resources, it is generally desirable to have a network technology with reduced communications complexity and efficient power and/or communications bandwidth utilization. For example, in an in-vehicle network (IVN) (e.g., with sensor nodes such as cameras, radars, and/or light detection and ranging (LiDAR) sensors) where power supply and communications bandwidth can be limited and the dimension and cost of network components are typically constrained, a network technology with reduced communications complexity and efficient power and bandwidth utilization can improve network lifetime, reduce power consumption and/or increase communications efficiency. However, typical network technology may not be able to provide reduced communications complexity and efficient power and bandwidth utilization that are suitable for a communications network with limited resources. Therefore, there is a need for a network technology that has reduced communications complexity and efficient power and/or communications bandwidth utilization.

SUMMARY

Embodiments of a device and method are disclosed. In an embodiment, a method of communications involves determining a characteristic of a header or a payload, generating an error control code for the header or for the header and the payload based on the characteristic of the header or the payload, and attaching the error control code to the header and the payload to form a data packet for communications in a wired communications network.

In an embodiment, the error control code includes a cyclic redundancy check (CRC) code.

In an embodiment, the characteristic of the header or the payload includes a communications protocol associated with the header or the payload.

In an embodiment, generating the error control code for the header or for the header and the payload based on the characteristic of the header or the payload includes generating the error control code for the header when a first communications protocol is associated with the header or the payload.

In an embodiment, generating the error control code for the header or for the header and the payload based on the characteristic of the header or the payload includes generating the error control code for the header and the payload when a second communications protocol that is different from the first communications protocol is associated with the header or the payload.

In an embodiment, the characteristic of the header or the payload includes a size of the payload.

In an embodiment, generating the error control code for the header or for the header and the payload based on the characteristic of the header or the payload includes generating the error control code for the header when the size of the payload is larger than a predefined threshold.

In an embodiment, generating the error control code for the header or for the header and the payload based on the characteristic of the header or the payload includes generating the error control code for the header and the payload when the size of the payload is smaller than a predefined threshold.

In an embodiment, the header includes information that indicates that the error control code is generated for the header or that the error control code is generated for the header and the payload.

In an embodiment, the information is stored in a data field of the header, and the data field has a size of a single bit.

In an embodiment, the header further includes protocol type information that indicates a communications protocol according to which the payload is encoded.

In an embodiment, the wired communications network is an IVN.

In an embodiment, the wired communications network is an asymmetrical communications network such that communications in a first direction of a network connection within the wired communications network occur at a first rate that is higher than a second rate at which communications in a second direction of the network connection occurs, and the first direction is opposite to the second direction.

In an embodiment, a communications device includes a packet generation unit configured to determine a characteristic of a header or a payload, generate an error control code for the header or for the header and the payload based on the characteristic of the header or the payload, and attach the error control code to the header and the payload to form a data packet for communications in a wired communications network, and a transmitter unit configured to transmit the data packet to the wired communications network.

In an embodiment, the error control code includes a CRC code.

In an embodiment, the characteristic of the header or the payload includes a communications protocol associated with the header or the payload.

In an embodiment, the packet generation unit is further configured to generate the error control code for the header when a first communications protocol is associated with the header or the payload.

In an embodiment, the packet generation unit is further configured to generate the error control code for the header and the payload when a second communications protocol that is different from the first communications protocol is associated with the header or the payload.

In an embodiment, the characteristic of the header or the payload includes a size of the payload, and the packet generation unit is further configured to generate the error control code for the header when the size of the payload is larger than a predefined threshold.

In an embodiment, a wired communications network includes a wired transmission media and communications devices configured to communicate via the wired transmission media. Each of the communications devices is configured to determine a characteristic of a header or a payload, generate an error control code for the header or for the header and the payload based on the characteristic of the header or the payload, and attach the error control code to the header and the payload to form a data packet for communications in the wired communications network.

Other aspects in accordance with the invention will become apparent from the following detailed description, taken in conjunction with the accompanying drawings, illustrated by way of example of the principles of the invention.

BRIEF DESCRIPTION OF THE DRAWINGS

FIG. 7 depicts a lookup table that can be used to select an error control generation option for a communications protocol.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
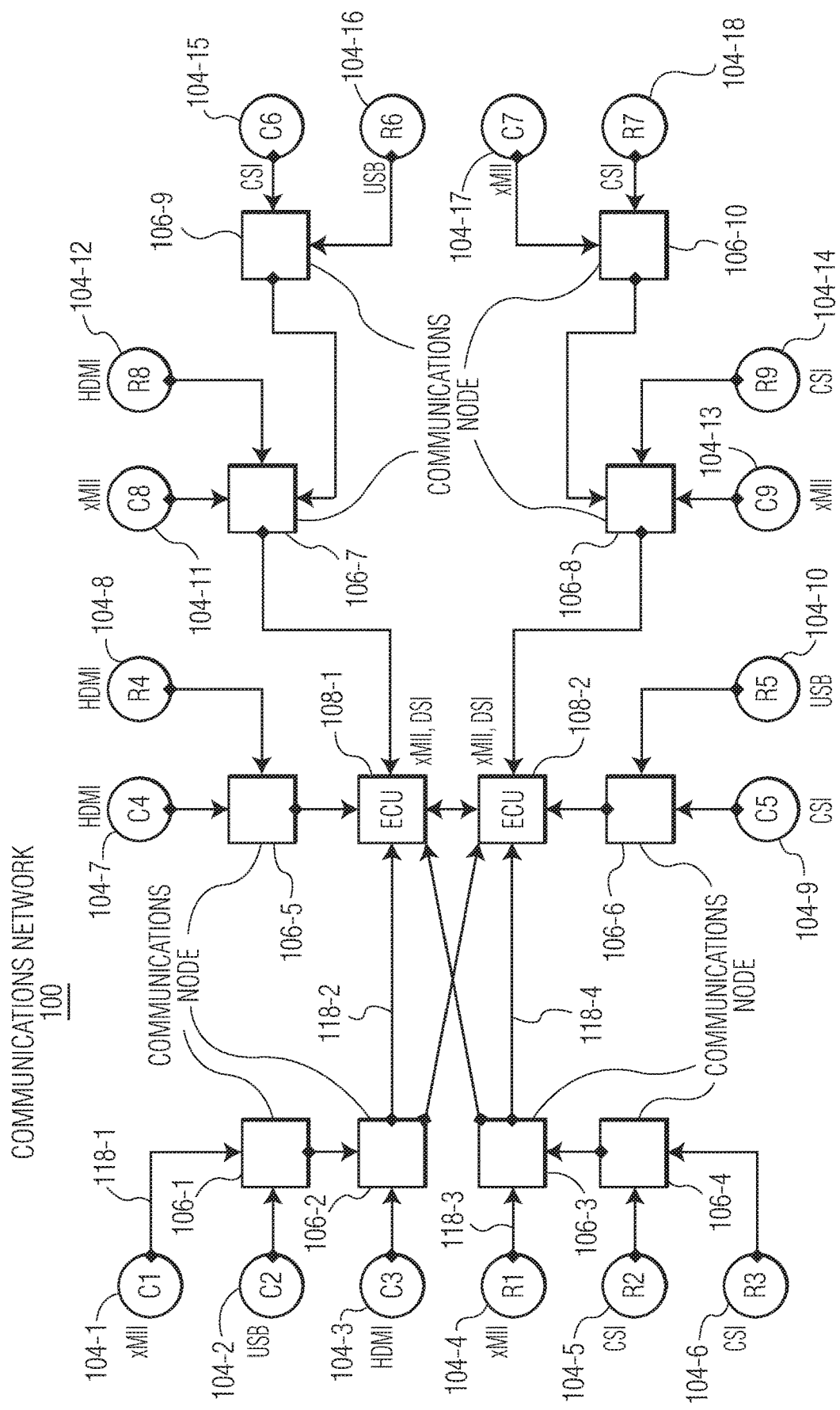
FIG. 1 depicts a communications network that includes multiple sensor nodes, communications nodes, and electronic control units (ECUs).

FIG. 1 depicts a communications network 100 that includes one or more sensor nodes 104-1, 104-2, ..., 104-18, one or more communications nodes 106-1, 106-2, ..., 106-10, and one or more electronic control units (ECUs) 108-1, 108-2. The communications network can be used in various applications, such as automotive applications, communications applications, industrial applications, medical applications, computer applications, and/or consumer or appliance applications. In some embodiments, the communications network is a wired communications network and the sensor nodes, the communications nodes, and the ECUs communicate through electrical cables or wires, which are made of conductive materials (e.g., metals). For example, the sensor nodes, the communications nodes, and the ECUs communicate through one or more coaxial cables, twisted pair cables, or fiber optic cables. Although the illustrated communications network 100 is shown with certain components and described with certain functionality herein, other embodiments of the communications network may include fewer or more components to implement the same, less, or more functionality. For example, the communications network may include at least one actuator and/or at least one display. In another example, in some embodiments, the communications network may include more than eighteen sensor nodes or less than eighteen sensor nodes, more than ten communications nodes or less than ten communications nodes, and/or more than two ECUs or less than two ECUs. In another example, although the sensor nodes, the communications nodes, and the ECUs are shown in FIG. 1 as being connected in certain topology, the network topology of the communications network is not limited to the topology shown in FIG. 1. Examples of network topology that can also be used by the communications network includes, without being limited to, point-to-point, star, bus, ring or circular, mesh, tree, or hybrid. For example, the sensor nodes, the communications nodes, and the ECUs can communicate through a communications bus, which carries analog differential signals and includes a high bus line and a low bus line, which may be connected between one or more resistors. In another example, two of the sensor nodes, the communications nodes, and/or the ECUs are connected by a point-to-point connection without any intervening device.

In the embodiment depicted in FIG. 1, the sensor nodes 104-1, 104-2, ..., 104-18 are configured to sense environmental or operational parameters or data, for example, within a vehicle and/or surrounding a vehicle. In some embodiments, the sensor nodes are configured to sense environmental or operational parameters or data within an automotive system (e.g., a vehicle) and/or surrounding an automotive system. The environmental or operational parameters or data gathered by the sensor nodes can be in any suitable format. Examples of the sensor nodes include, without being limited to, image sensors/cameras, video sensors/cameras, capacitance sensors, inductive sensors, pressure sensors, thermal or temperature sensors (e.g., infrared thermometers), position sensors (e.g., altimeters, gyroscopes, LiDAR sensors), proximity or presence sensors (e.g., motion detectors, radars (e.g., Doppler radars)), vibration sensors, acoustic sensors, optical sensors, moisture sensors, humidity sensors, fluid property sensors (e.g., flow sensors), voltage sensors, current sensors, and chemical sensors. In some embodiments, the sensor nodes are automotive sensors, such as air flow meters, air-fuel ratio meters, blind spot monitors, crankshaft position sensors, engine coolant temperature sensors, hall effect sensors, wheel speed sensors, airbag sensors, automatic transmission speed sensors, brake fluid pressure sensors, camshaft or crankshaft position sensors, cylinder head temperature gauges, engine pressure sensors, exhaust gas temperature sensors, fuel level sensors, fuel pressure sensors, light sensors, oil level sensors, oxygen sensors, radars, speed sensors, throttle position sensors, tire pressure sensors, torque sensors, transmission fluid temperature sensors, turbine speed sensors, variable reluctance sensors, wheel speed sensors, anti-lock braking system (ABS) sensors and/or battery sensors. Although the sensor nodes are illustrated in FIG. 1 as being certain types of sensors (e.g., cameras C1, C2, C3, C4, C5, C6, C7, C8, and C9, and radars R1, R2, R3, R4, R5, R6, R7, R8, and R9), in other embodiments, the sensor nodes are implemented as other types of sensors.

In the embodiment depicted in FIG. 1, the communications nodes 106-1, 106-2, . . . , 106-10 are configured to transmit and receive data. The data transmitted and received by the communications nodes can be in any suitable format. In an embodiment, the data transmitted and received are data frames. In addition to communication, each of the communications nodes may be configured to perform an application such as an automotive application. In some embodiments, at least one of the communications nodes is implemented as a switch or a daisy chain node that can be serially connected with other daisy chain node to form a daisy chain network. In the daisy chain network, data is serially transmitted uplink or downlink through daisy chain nodes. For example, when a first daisy chain node receives data from a second daisy chain node, the first daisy chain node can forward the received data to a third daisy chain node. Although the communications network is illustrated in FIG. 1 as including ten communications nodes, in other embodiments, the communications network includes more than ten communications nodes or less than ten communications nodes.

In the embodiment depicted in FIG. 1, the ECUs 108-1, 108-2 are configured to control one or more devices, such as the sensor nodes 104-1, 104-2, . . . , 104-18 and/or the communications nodes 106-1, 106-2, . . . , 106-10, and/or process data received from one or more devices, such as the sensor nodes 104-1, 104-2, . . . , 104-18 and/or the communications nodes 106-1, 106-2, . . . , 106-10. The ECUs can be used in various applications, such as automotive applications, communications applications, industrial applications, medical applications, computer applications, and/or consumer or appliance applications. In some embodiments, the ECUs 108-1, 108-2 are configured to control one or more electronic components within an automobile system such as a vehicle. Each ECU may collect data from one or more sensor nodes, run application software, control one or more actuators, and/or communicate to other ECU via the communication network. In these embodiments, the ECUs include at least one engine control module (ECM), at least one power train control module (PCM), at least one airbag, at least one antilock brake, at least one cruise control module, at least one electric power steering module, at least one audio system module, at least one window control module, at least one door control module, at least one mirror adjustment module, and/or at least one battery and/or recharging system for electrical or hybrid automotive systems. Although the communications network is illustrated in FIG. 1 as including two ECUs, in other embodiments, the communications network includes more than two ECUs or less than two ECUs.

In the embodiment depicted in FIG. 1, the eighteen sensor nodes 104-1, 104-2, . . . , 104-18 communicate according to various communications protocols, such as, Universal Serial Bus (USB), media-independent interface (MII) (e.g., reduced media-independent interface (RMII), gigabit media-independent interface (GMII), reduced gigabit media-independent interface (RGMII), 10-gigabit media-independent interface (XGMII) and serial gigabit media-independent interface (SGMII), etc., referred to collectively as "xMII"), Camera Serial Interface (CSI), and High-Definition Multimedia Interface (HDMI). The ECUs 108-1, 108-2 communicate according to xMII and Display Serial Interface (DSI) protocols. However, protocols according to which the sensor nodes and the ECUs communicate are not limited to the protocols shown in FIG. 10. Examples of the protocols according to which the sensor nodes and the ECUs communicate include, without being limited to, USB, xMII, CSI, Camera Serial Interface 2 (CSI-2), HDMI, DSI, Inter-integrated Circuit ($I^2C$) Protocol, Ethernet, Serial Peripheral Interface (SPI), and general-purpose input/output (GPIO). In some embodiments, each communications device within the communications network 100 is assigned a unique address. For example, each of the sensor nodes 104-1, 104-2, . . . , 104-18, the communications nodes 106-1, 106-2, . . . , 106-10, and the ECUs 108-1, 108-2 is assigned a unique address. In some embodiments, communications devices within the communications network 100 are assigned to cluster and each cluster is assigned a unique address.

In the embodiment depicted in FIG. 1, communications between the sensor nodes 104-1, 104-2, . . . , 104-18, the communications nodes 106-1, 106-2, . . . , 106-10, and the ECUs 108-1, 108-2 can be characterized as "symmetrical" or "asymmetrical." In symmetrical communications, both communications devices transmit and receive data at the same data rate. For example, in an Ethernet-based point-to-point network both communications devices transmit and receive at, for example, 10 Gbps. In asymmetrical communications, communications in one direction, e.g., on the forward channel, occur at a higher rate than in the other direction, e.g., on the backward channel. For example, a high data rate is needed from one of the sensor nodes to a corresponding communications node or a corresponding ECU (e.g., the forward channel) but a much lower data rate is needed from a corresponding communications node or a corresponding ECU to one of the sensor nodes (e.g., the backward channel). An example use case for asymmetrical communications in an IVN may be a camera (e.g., a backup camera), where a high data rate is needed from the camera to a control/display ECU (e.g., the forward channel) but a much lower data rate is needed from the control/display ECU to the camera (e.g., the backward channel). For example, a high data rate is needed from the camera, C1, to the communication node 106-1 (e.g., the forward channel of a communications link 118-1) but a much lower data rate is needed from the communication node 106-1 to the camera, C1, (e.g., the backward channel of the communications link 118-1) and a high data rate is needed from the communication node 106-2 to the ECU 108-1 (e.g., the forward channel of a communications link 118-2) but a much lower data rate is needed from the ECU 108-1 to the communication node 106-2 (e.g., the backward channel of the communications link 118-2). Another example use case for asymmetrical communications in an IVN may be a LiDAR sensor or a radar, where a high data rate is needed from the LiDAR sensor or the radar to a control/display ECU (e.g., the forward channel) but a much lower data rate is needed from the control/display ECU to the LiDAR sensor or the radar (e.g., the backward channel). For example, a high data rate is needed from the radar, R1, to the communication node 106-3 (e.g., the forward channel of a communications link 118-3) but a much lower data rate is needed from the communication node 106-3 to the radar, R1, (e.g., the backward channel of the communications link 118-3) and a high data rate is needed from the communication node 106-3 to the ECU 108-3 (e.g., the forward channel of a communications link 118-4) but a much lower data rate is needed from the ECU 108-2 to the communication node 106-3, (e.g., the backward channel of the communications link 118-4).

Figure 2:
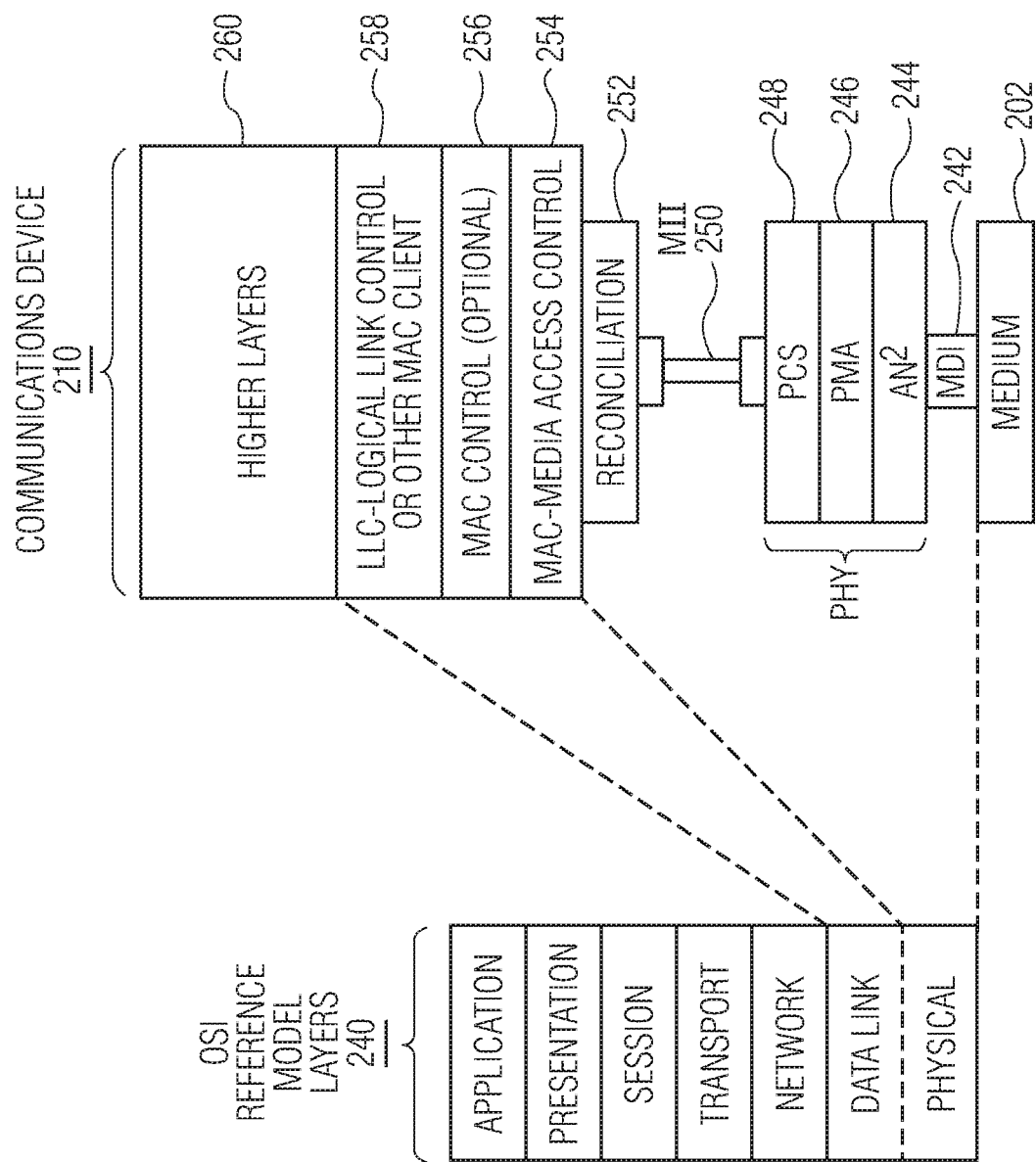
FIG. 2 depicts a communications node and an OSI reference model.

FIG. 2 illustrates a communications device 210 that can be used in the communications network 100. FIG. 2 also depicts the layers of the OSI reference model 240 as well as an expanded view of the physical layer and the data link layer. The communications device depicted in FIG. 2 is an embodiment of the sensor nodes 104-1, 104-2, ..., 104-18, the communications nodes 106-1, 106-2, ..., 106-10, and/or the ECUs 108-1, 108-2 depicted in FIG. 1. However, the sensor nodes, the communications nodes, and/or the ECUs depicted in FIG. 1 are not limited to the embodiment shown in FIG. 2. As shown in FIG. 2, the OSI reference model includes the physical layer (also referred to as layer 1 or L1), the data link layer (also referred to as layer 2 or L2), the network layer (also referred to as layer 3 or L3), the transport layer (also referred to as layer 4 or L4), the session layer (also referred to as layer 5 or L5), the presentation layer (also referred to as layer 6 or L6), and the application layer (also referred to as layer 7 or L7). Elements in the expanded view of the physical layer include media-dependent sublayers of a transmission medium or media 202, a media-dependent interface (MDI) 242, an auto-negotiation layer (AN2) 244, a physical medium attachment (PMA) 246, and a physical coding sublayer (PCS) 248, and media-independent sublayers of a media-independent interface (MII) 250 (e.g., reduced media-independent interface (RMII), gigabit media-independent interface (GMII), reduced gigabit media-independent interface (RGMII), 10-gigabit media-independent interface (XGMII) and serial gigabit media-independent interface (SGMII), etc., referred to collectively as "xMII"), and a reconciliation sublayer 252. In an embodiment, elements of the PCS, PMA, and AN2 are included in a physical layer chip, often referred to as a "PHY chip" and or simply as a "PHY" as indicated in FIG. 2. Elements in the expanded view of the data link layer include a media access control (MAC) layer 254, an optional MAC control layer 256, and a logical link control (LLC) 258, or other MAC client layer. Higher layers 260 may be implemented above the data link layer.

Figure 3:
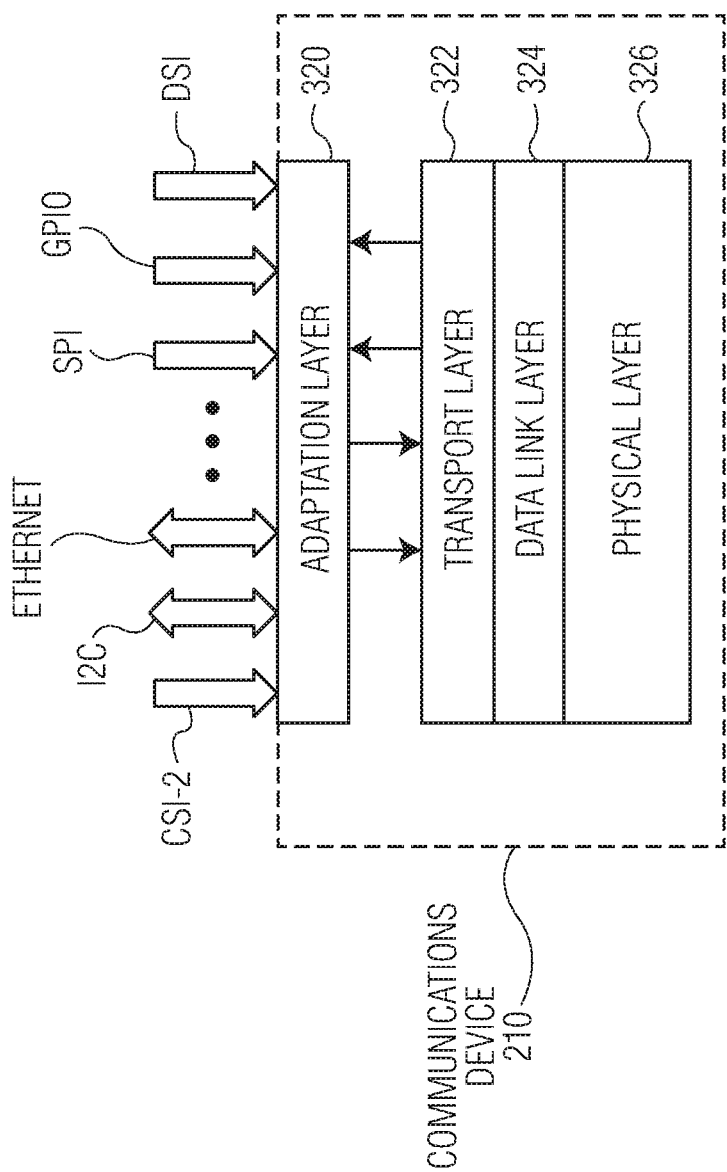
FIG. 3 illustrates a tunneling technique of the communications device depicted in FIG. 2.

FIG. 3 illustrates a tunneling technique of the communications device 210 depicted in FIG. 2. As illustrated in FIG. 3, an adaptation layer 320 within the communications device 210 allows data in different protocol formats to tunnel through the communications device by generating packets for all supported protocol formats. In some embodiments, the adaptation layer fragments each received data frame or packet if necessary, assigns a protocol type for each fragment, and assigns a packet counter field start and end value to each protocol type. In some embodiments, the functionality of the adaptation layer is implemented in hardware (e.g., circuits), software, firmware, or a combination thereof. Examples of protocol formats that can be supported by the Adaption layer include, without being limited to, CSI, CSI-2, I²C Protocol, Ethernet, SPI, GPIO), and DSI. Transport layer 322 forwards packets from the adaptation layer to the data link layer. Data link layer 324 checks for error in received packets and establishes a communications links with a partner device using, for example, Start of Packet (SoP) and End of Packet (EoP) signals. Physical layer 326 transmits and receives data from other devices.

Figure 4:
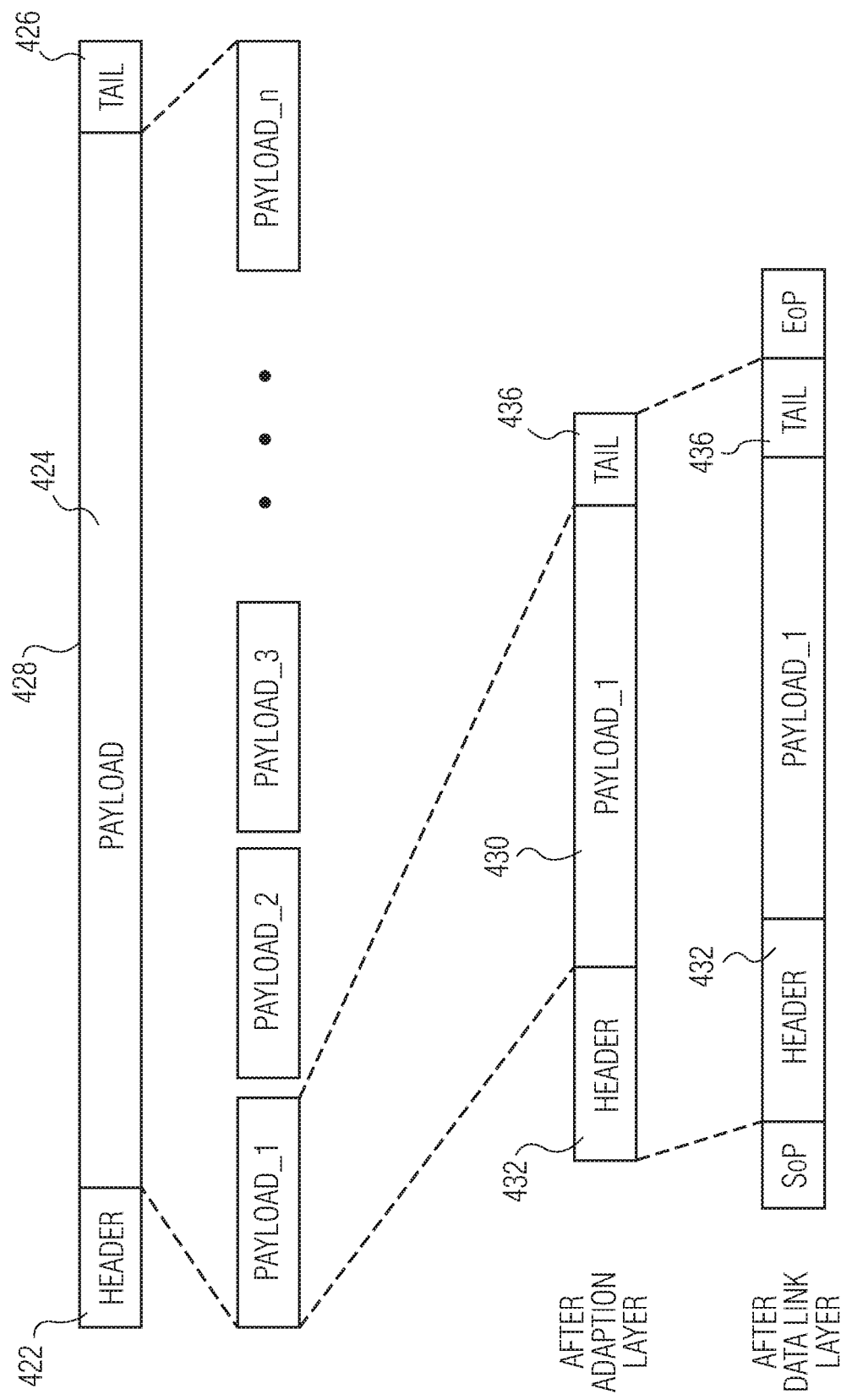
FIG. 4 illustrates a packet generation operation that can be performed by the communications device depicted in FIG. 2 using the tunneling technique illustrated in FIG. 3.

FIG. 4 illustrates a packet generation operation that can be performed by the communications device 210 depicted in FIG. 2 using the tunneling technique illustrated in FIG. 3. As illustrated in FIG. 4, payload 424 of a data structure 428 (also includes a header 422 and a tail section 426) that is transmitted, generated, and/or encoded according to a certain protocol (e.g., in a certain protocol format) is packaged into a packet 430 with a header 432 and a tail section 436. Examples of information that can be included in the header or the tail section include, without being limited to, protocol type information, address information, packet counter, priority information and error-detecting code or error correction code (e.g., cyclic redundancy check (CRC), forward error correction (FEC)). For example, each payload segment, payload_1, payload_2, payload_3, ..., or payload_N (where N is an integer greater than 1) of the data structure 428 (e.g., a frame according to CSI-2, I²C, Ethernet, SPI, GPIO, or DSI), is re-packaged by the adaptation layer 320 with the header 432 and the tail section 436 to generate the packet 430. At the data link layer 324, SoP and EoP values are inserted into the packet 430 that is generated by the adaptation layer.

Turning back to FIG. 1, error control techniques, such as error detecting code and/or error correcting codes can be used in the communications network 100 to control the occurrences of communications errors (e.g., to improve bit error rate). In a communications network with limited resources, it is generally desirable to have an error control technology with reduced communications complexity and efficient power and/or communications bandwidth utilization. For example, in an in-vehicle network (IVN) (e.g., with sensor nodes such as cameras, radars, and/or light detection and ranging (LiDAR) sensors) where power supply and communications bandwidth can be limited and the dimension and cost of network components are typically constrained, an error control technology with reduced communications complexity and efficient power and bandwidth utilization can improve network lifetime, reduce power consumption and/or increase communications efficiency. However, typical error control techniques may not be able to provide reduced communications complexity and efficient power and bandwidth utilization that are suitable for a communications network with limited resources. For example, typical error control techniques apply error control on entire data packet content, which includes a header and a payload. However, different data streams from sensors to ECUs/actuators/displays or vice versa may not require the same level of error control protection. In accordance with an embodiment of the invention, a method of communications involves determining a characteristic of a header or a payload, generating an error control code (e.g, an error detecting code such as a cyclic redundancy check (CRC) code or an error correcting code) for the header or for the header and the payload based on the characteristic of the header or the payload, and attaching the error control code to the header and the payload to form a data packet for communications in a wired communications network. By applying header only error control protection or header and payload error control protection based on a characteristic of the header or the payload, the complexity of error control protection can be adapted to the characteristic of the header or the payload. For example, the error control code may be generated for the header or for the header and the payload based on a communications protocol associated with the header or the payload and/or a size of the payload. Consequently, the size of the packet and communications overhead can be reduced and, as a result, power consumption for packet communications can be reduced.

Figure 5:
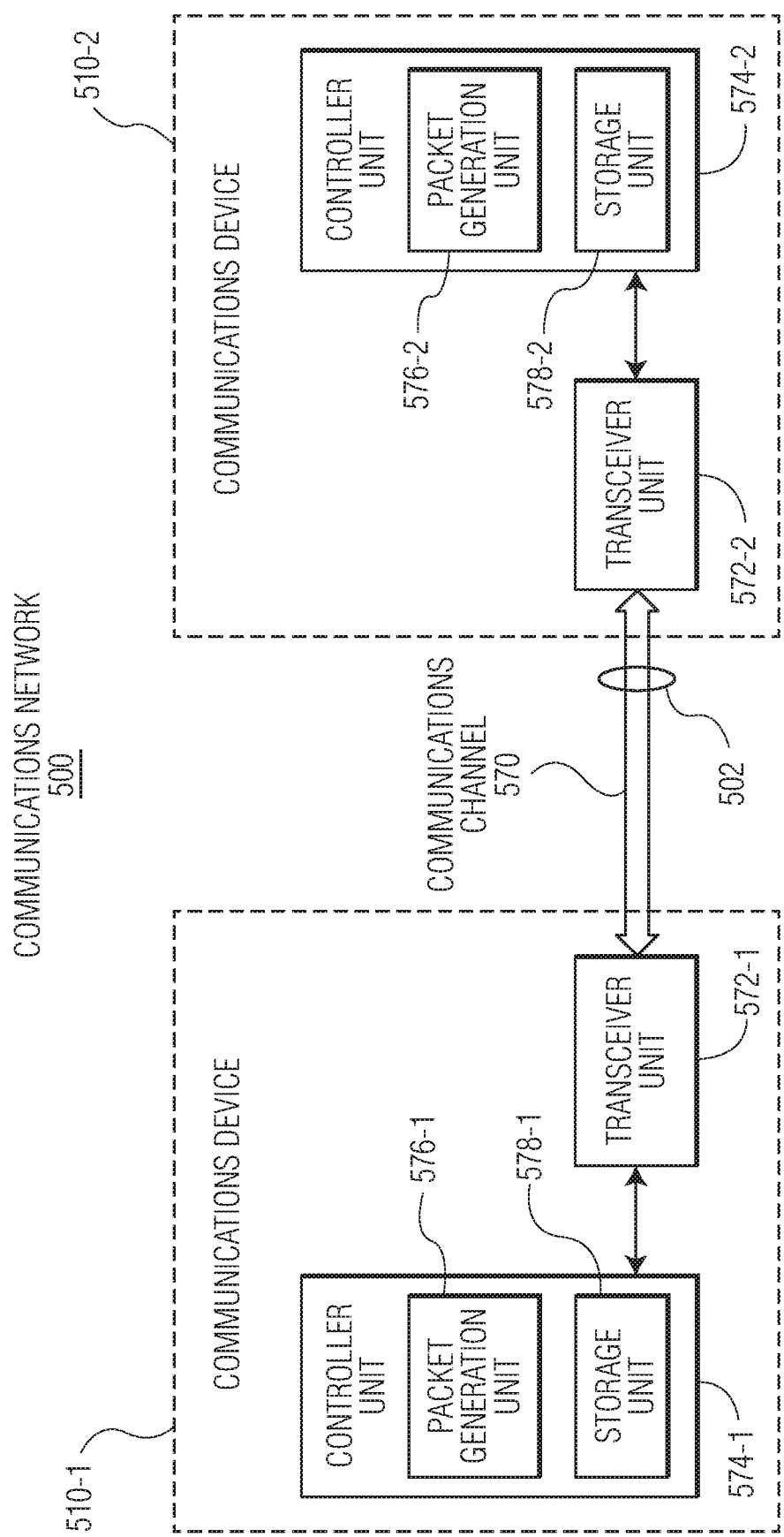
FIG. 5 depicts a communications network that includes communication devices.

FIG. 5 depicts a communications network 500 that includes communication devices 510-1, 510-2. In the embodiment depicted in FIG. 5, the communication device 510-1 includes a transceiver unit 572-1 and a controller unit 574-1, which includes a packet generation unit 576-1 and an optional storage unit 578-1. The communication device 510-2 includes a transceiver unit 572-2 and a controller unit 574-2, which includes a packet generation unit 576-2 and an optional storage unit 578-2. The communication devices 510-1, 510-2 communicate through a communications channel 570 over a transmission medium 502, such as an electrical cable or wire, which is made of one or more conductive materials (e.g., metals). In some embodiments, the communications channel 570 is a symmetrical communications channel in which both communications devices 510-1, 510-2 transmit and receive data at the same data rate. In other embodiments, the communications channel 570 is an asymmetrical communications channel in which communications devices 510-1, 510-2 transmit and receive data at different data rates (e.g., communications in one direction of the communications channel, e.g., on the forward channel, occur at a higher rate than in the other direction of the communications channel, e.g., on the backward channel). The communication devices 510-1, 510-2 depicted in FIG. 5 are embodiments of the sensor nodes 104-1, 104-2, . . . , 104-18, the communications nodes 106-1, 106-2, . . . , 106-10, and/or the ECUs 108-1, 108-2 depicted in FIG. 1. However, the sensor nodes, the communications nodes, and/or the ECUs depicted in FIG. 1 are not limited to the embodiment shown in FIG. 5. Although the illustrated communication devices 510-1, 510-2 are shown with certain components and described with certain functionality herein, other embodiments of the communication devices 510-1, 510-2 may include fewer or more components to implement the same, less, or more functionality. In addition, although the transceiver units, the packet generation units, the storage units, and the packet generation units are shown in FIG. 5 as being connected in certain manner within the communication devices 510-1, 510-2, in other embodiments, the transceiver units, the packet generation units, the storage units, and the packet generation units are connected in a different manner as shown in FIG. 5.

In the communication device 510-1 depicted in FIG. 5, the transceiver unit 572-1 is configured to transmit and/or receive data from the transceiver unit 572-2 of the communication device 510-2 through the communications channel 570. The controller unit 574-1 is configured to perform data generation and processing and other control function for the communication device 510-1. In an embodiment, the controller unit is implemented within a processor, such as a microcontroller, a host processor, a host, a digital signal processor (DSP), or a central processing unit (CPU). The packet generation unit 576-1 is configured to generate at least one data packet for communications. The packet generation unit may be configured to perform an error control operation for the communication device 510-1. In some embodiments, the packet generation unit is configured to determine a characteristic of a header or a payload, generate an error control code for the header or for the header and the payload based on the characteristic of the header or the payload, and attach the error control code to the header and the payload to form a data packet for communications in a wired communications network. By applying header only error control protection or header and payload error control protection based on a characteristic of the header or the payload, the complexity of error control protection can be adapted to the characteristic of the header or the payload. For example, the error control code may be generated for the header or for the header and the payload based on a communications protocol associated with the header or the payload and/or a size of the payload. Consequently, the size of the packet and communications overhead can be reduced and, as a result, power consumption for packet communications can be reduced. The error control code may include an error detecting code and/or an error correcting code. In some embodiments, the error control code includes is a cyclic redundancy check (CRC) code/checksum or is a CRC code/checksum. In some embodiments, the characteristic of the header or the payload includes a communications protocol associated with the header or the payload. In these embodiments, the packet generation unit is further configured to generate the error control code for the header when a first communications protocol is associated with the header or the payload. The packet generation unit may be further configured to generate the error control code for the header and the payload when a second communications protocol that is different from the first communications protocol is associated with the header or the payload. In some embodiments, the characteristic of the header or the payload includes a size of the payload. In these embodiments, the packet generation unit is further configured to generate the error control code for the header when the size of the payload is larger than a predefined threshold. The packet generation unit may be further configured to generate the error control code for the header and the payload when the size of the payload is smaller or equal to than a predefined threshold. In some embodiments, the header includes information that indicates that the error control code is generated for the header or that the error control code is generated for the header and the payload. The information may be stored in a data field of the header, which may have a size of a single bit to reduce communications overhead. The packet generation unit may be implemented in hardware (e.g., circuits), software, firmware, or a combination thereof. The storage unit 578-1 is configured to store error control information and/or other information. For example, in an embodiment, the storage unit 578-1 is configured to store a characteristic of a header or a payload or a lookup table for selecting generating an error control code for the header only or generating an error control code for the header and the payload based on, e.g., a communications protocol is associated with the header or the payload and/or a size of the header or the payload. The storage unit 578-1 can be implemented by various types of storage elements. Examples of the storage unit 578-1 includes, without being limited to, a semiconductor or solid-state memory (e.g., a random-access memory (RAM) or a read-only memory (ROM)), magnetic tape, a computer hard disk, a flash drive, a removable computer diskette, a rigid magnetic disk, and an optical disk.

In the communication device 510-2 depicted in FIG. 5, the transceiver unit 572-2 is configured to transmit and/or receive data from the transceiver unit 572-1 of the communication device 510-1 through the communications channel 570. The controller unit 574-2 is configured to perform data generation and processing and other control function for the communication device 510-2. In an embodiment, the controller unit is implemented within a processor, such as a microcontroller, a host processor, a host, a DSP, or a CPU. The packet generation unit 576-2 is configured to generate at least one data packet for communications. The packet generation unit may be configured to perform an error control operation for the communication device 510-2. In some embodiments, the packet generation unit is configured to determine a characteristic of a header or a payload, generate an error control code for the header or for the header and the payload based on the characteristic of the header or the payload, and attach the error control code to the header and the payload to form a data packet for communications in a wired communications network. By applying header only error control protection or header and payload error control protection based on a characteristic of the header or the payload, the complexity of error control protection can be adapted to the characteristic of the header or the payload. For example, the error control code may be generated for the header or for the header and the payload based on a communications protocol associated with the header or the payload and/or a size of the payload. Consequently, the size of the packet and communications overhead can be reduced and, as a result, power consumption for packet communications can be reduced. The error control code may include an error detecting code and/or an error correcting code. In some embodiments, the error control code includes is a CRC code/checksum or is a CRC code/checksum. In some embodiments, the characteristic of the header or the payload includes a communications protocol associated with the header or the payload. In these embodiments, the packet generation unit is further configured to generate the error control code for the header when a first communications protocol is associated with the header or the payload. The packet generation unit may be further configured to generate the error control code for the header and the payload when a second communications protocol that is different from the first communications protocol is associated with the header or the payload. In some embodiments, the characteristic of the header or the payload includes a size of the payload. In these embodiments, the packet generation unit is further configured to generate the error control code for the header when the size of the payload is larger than a predefined threshold. The packet generation unit may be further configured to generate the error control code for the header and the payload when the size of the payload is smaller or equal to than a predefined threshold. In some embodiments, the header includes information that indicates that the error control code is generated for the header or that the error control code is generated for the header and the payload. The information may be stored in a data field of the header, which may have a size of a single bit to reduce communications overhead. The packet generation unit may be implemented in hardware (e.g., circuits), software, firmware, or a combination thereof. The storage unit 578-2 is configured to store error control information and/or other information. For example, in an embodiment, the storage unit 578-2 is configured to store a characteristic of a header or a payload or a lookup table for selecting generating an error control code for the header only or generating an error control code for the header and the payload based on, e.g., a communications protocol is associated with the header or the payload and/or a size of the header or the payload. The storage unit 578-2 can be implemented by various types of storage elements. Examples of the storage unit 578-2 includes, without being limited to, a semiconductor or solid-state memory (e.g., a RAM or a ROM), magnetic tape, a computer hard disk, a flash drive, a removable computer diskette, a rigid magnetic disk, and an optical disk.

Figure 6:
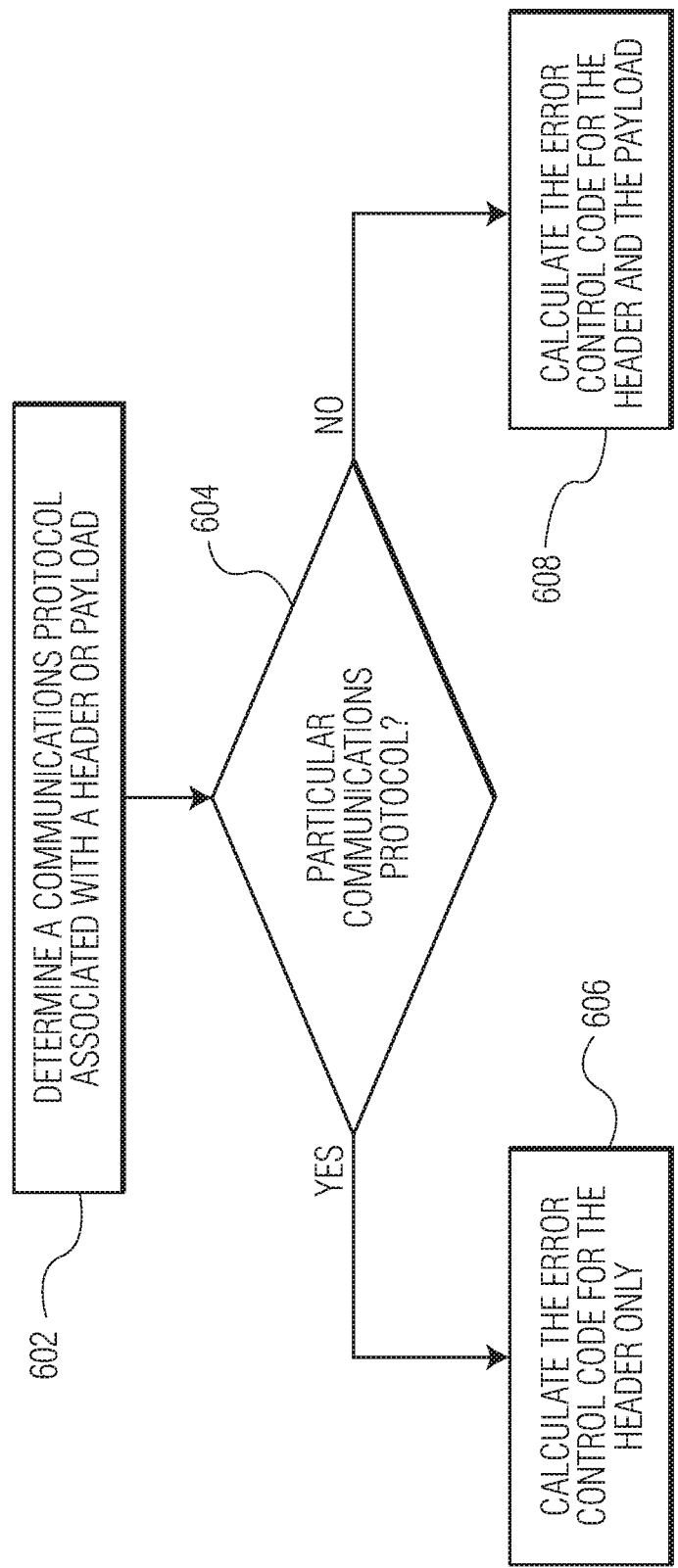
FIG. 6 is a flow diagram of an error control code generation process in accordance with an embodiment of the invention.

FIG. 6 is a flow diagram of an error control code generation process in accordance with an embodiment of the invention. The error control code generation process can be performed by the communications devices 510-1, 510-2 depicted in FIG. 5 (e.g., the packet generation units 576-1, 576-2). At block 602, a communications protocol associated with a header and/or a payload is determined. For example, a communications protocol (e.g., USB, I$^2$C, CSI, xMII, or DSI) in which the header and/or the payload is transmitted, generated, and/or encoded (e.g., in a certain protocol format) is determined. Next, at block 604, it is determined whether or not the communications protocol associated with the header or the payload is a particular communications protocol or belongs to a particular group of communications protocols, for example, based on a lookup table. Next, at block 606, if/when the communications protocol associated with the header or the payload is a particular communications protocol or belongs to a particular group of communications protocols, the error control code is calculated for the header only. For example, for communications protocols such as xMII or CSI2, CRC checksum is calculated for the header only. At block 608, if/when the communications protocol associated with the header or the payload is not a particular communications protocol or does not belong to a particular group of communications protocols, the error control code is calculated for the header and the payload. For example, for a communications protocol such as I$^2$C, CRC checksum is calculated for the header and the payload.

FIG. 7 depicts a protocol-to-error control generation lookup table 700 that can be used to select an error control generation option for a communications protocol. For example, the protocol-to-error control generation lookup table can be used by the packet generation units 576-1, 576-21 depicted in FIG. 5. As depicted in FIG. 7, the protocol-to-error control generation lookup table contains protocols entries for four communications protocols and error control generation selection for these four communications protocols. Specifically, for a payload in the format of a communications protocol "protocol_1" or "protocol_4," an error control code is calculated for a header of the payload only. For a payload in the format of a communications protocol "protocol_2" or "protocol_3," an error control code is calculated for a header of the payload and the payload. Although four communications protocols are shown in the lookup table of FIG. 7, in other embodiments, less than four communications protocols or more than four communications protocols is included in a protocol-to-error control generation lookup table.

Figure 8:
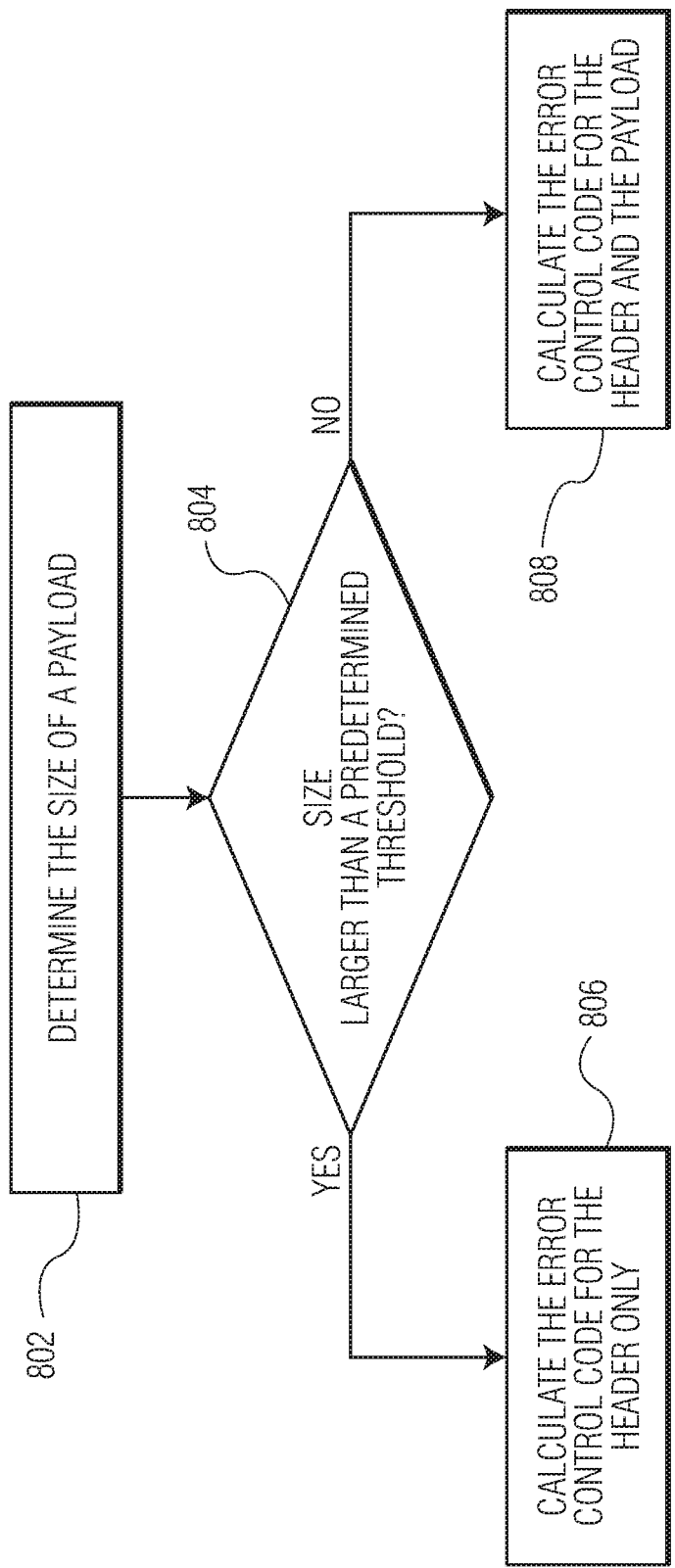
FIG. 8 is a flow diagram of an error control code generation process in accordance with an embodiment of the invention.

FIG. 8 is a flow diagram of an error control code generation process in accordance with an embodiment of the invention. The error control code generation process can be performed by the communications devices 510-1, 510-2 depicted in FIG. 5 (e.g., the packet generation units 576-1, 576-2). At block 802, the size of a payload is determined. Next, at block 804, it is determined whether or not the size of the payload is larger than a predetermined threshold. Next, at block 806, if/when the size of the payload is larger than the predetermined threshold, the error control code is calculated for the header only. For example, for a long data frame that carries sensed data, CRC checksum is calculated for the header only. At block 608, if/when the size of the payload is equal to or smaller than the predetermined threshold, the error control code is calculated for the header and the payload. For example, for a short data frame that carries control information, CRC checksum is calculated for the header and the payload.

Figure 9:
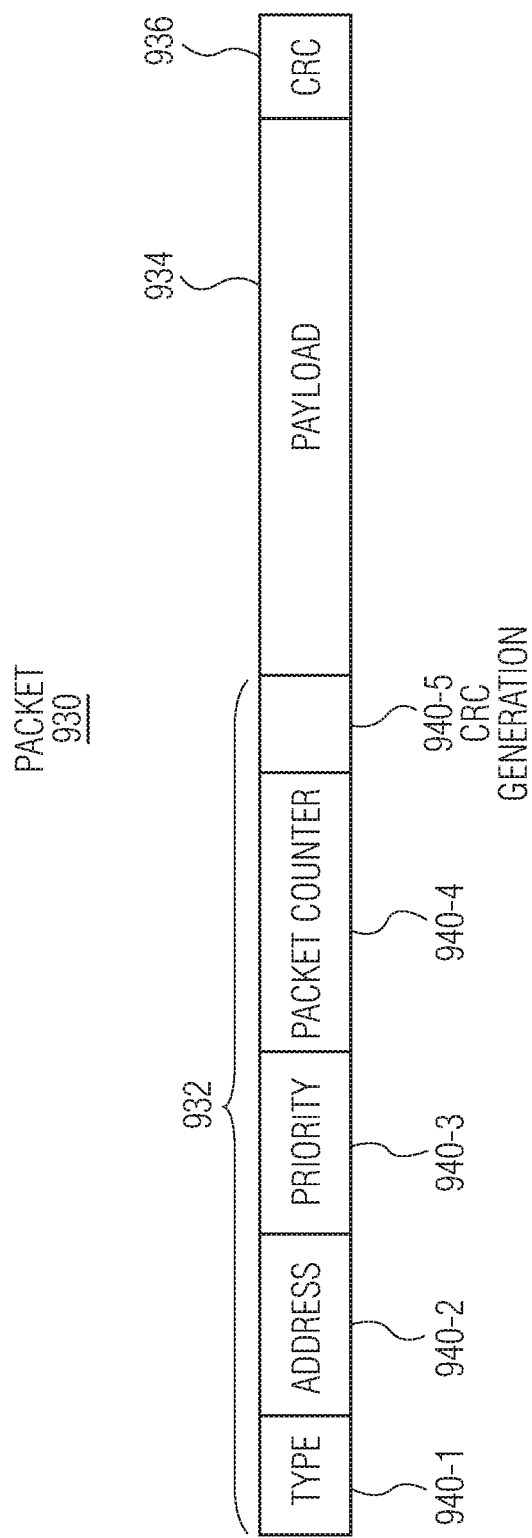
FIG. 9 depicts a packet in accordance with an embodiment of the invention.

FIG. 9 depicts a packet 930 in accordance with an embodiment of the invention. The packet 930 can be generated, transmitted, and/or received and processed by the communications devices 510-1, 510-2 depicted in FIG. 5 (e.g., the controller units 574-1, 574-2). As depicted in FIG. 9, the packet 930 includes a header 932, a payload 934, and a CRC 936. In the embodiment depicted in FIG. 9, the header of the packet includes a protocol type data field 940-1, an address data field 940-2, a priority data field 940-3, a packet counter data field 940-4, and a CRC generation data field 940-5. The protocol type data field contains information that indicates a communications protocol under which the packet or the payload of the packet is transmitted, generated, and/or encoded (e.g., in a certain protocol format). The address data field contains address information (e.g., a source address and/or a destination address) to indicate a source and/or a destination of the packet. The priority data field contains information that indicates priority of the packet. The packet counter data field contains information that indicates a packet counter value or a packet sequence value, which can be used as a timestamp from a transmitting device or to determine if a particular packet is lost. The CRC generation data field contains information that indicates if the CRC is calculated for the header only or is calculated for the header and the payload. In some embodiments, the CRC generation data field has a size of one bit to reduce communications overhead. For example, a value of 0 in the CRC generation data field indicates that the CRC is calculated for the header only while a value of 1 in the CRC generation data field indicates that the CRC is calculated for the header and the payload. In another example, a value of 1 in the CRC generation data field indicates that the CRC is calculated for the header only while a value of 0 in the CRC generation data field indicates that the CRC is calculated for the header and the payload. In an embodiment, the packet generation units 576-1, 576-2 generate CRCs either for the header only or for the head and the payload, attach the CRCs to the payload, and set the CRC generation data field to indicate whether CRCs are generated for the header only or for the head and the payload.

Figure 10:
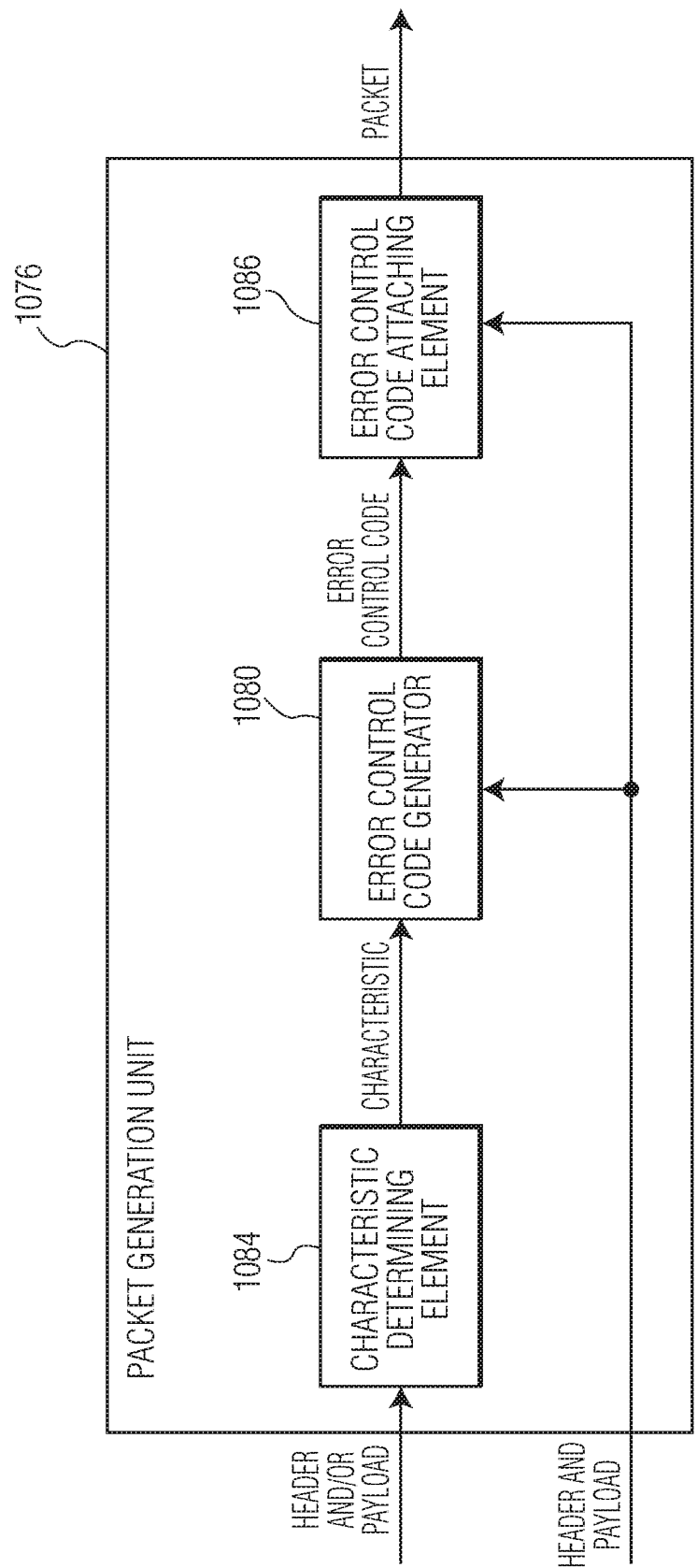
FIG. 10 depicts an embodiment of a packet generation unit.

FIG. 10 depicts a packet generation unit 1076, which is an embodiment of the packet generation units 576-1, 576-2 of the communication devices 510-1, 510-2 depicted in FIG. 5. The packet generation unit 1076 depicted in FIG. 10 is one possible embodiment of the packet generation units 576-1, 576-2 depicted in FIG. 5. However, the packet generation units 576-1, 576-2 depicted in FIG. 5 are not limited to the embodiment shown in FIG. 10. In the embodiment depicted in FIG. 10, the packet generation unit 1076 includes a characteristic determining element 1084, an error control code generator 1080, and an error control code attaching element 1086. Each of the characteristic determining element, the error control code generator, and the error control code attaching element may be implemented in hardware (e.g., circuits), software, firmware, or a combination thereof. In an embodiment, at least one of the characteristic determining element, the error control code generator, and the error control code attaching element is implemented within a processor, such as a microcontroller, a host processor, a host, a DSP, or a CPU.

In the embodiment depicted in FIG. 10, the characteristic determining element 1084 is configured to determine a characteristic of a header or a payload. The error control code generator 1080 is configured to generate an error control code for the header or for the header and the payload based on the characteristic of the header or the payload. The error control code may include a CRC code or checksum. The error control code attaching element 1086 is configured to attach the error control code to the header and the payload to form a data packet for communications in a wired communications network, which may be an in-vehicle network (IVN). In some embodiments, the characteristic of the header or the payload includes a communications protocol associated with the header or the payload. In these embodiments, the error control code generator is further configured to generate the error control code for the header when a first communications protocol is associated with the header or the payload and to generate the error control code for the header and the payload when a second communications protocol that is different from the first communications protocol is associated with the header and/or the payload. The error control code generator may include a selection device such as a multiplexer to select the header or the header and the payload to calculate an error control code. In some embodiments, the characteristic of the header or the payload includes a size of the payload. In these embodiments, the error control code generator is further configured to generate the error control code for the header when the size of the payload is larger than a predefined threshold and to generate the error control code for the header and the payload when the size of the payload is smaller than a predefined threshold. In some embodiments, the header includes information that indicates that the error control code is generated for the header or that the error control code is generated for the header and the payload. The information may be stored in a data field of the header that has a size of a single bit. In some embodiments, the header further includes protocol type information that indicates a communications protocol according to which the payload is transmitted, generated, and/or encoded (e.g., in a certain protocol format). In some embodiments, the wired communications network is an asymmetrical communications network such that communications in a first direction of a network connection within the wired communications network occur at a first rate that is higher than a second rate at which communications in a second direction of the network connection occurs, and wherein the first direction is opposite to the second direction.

Figure 11:
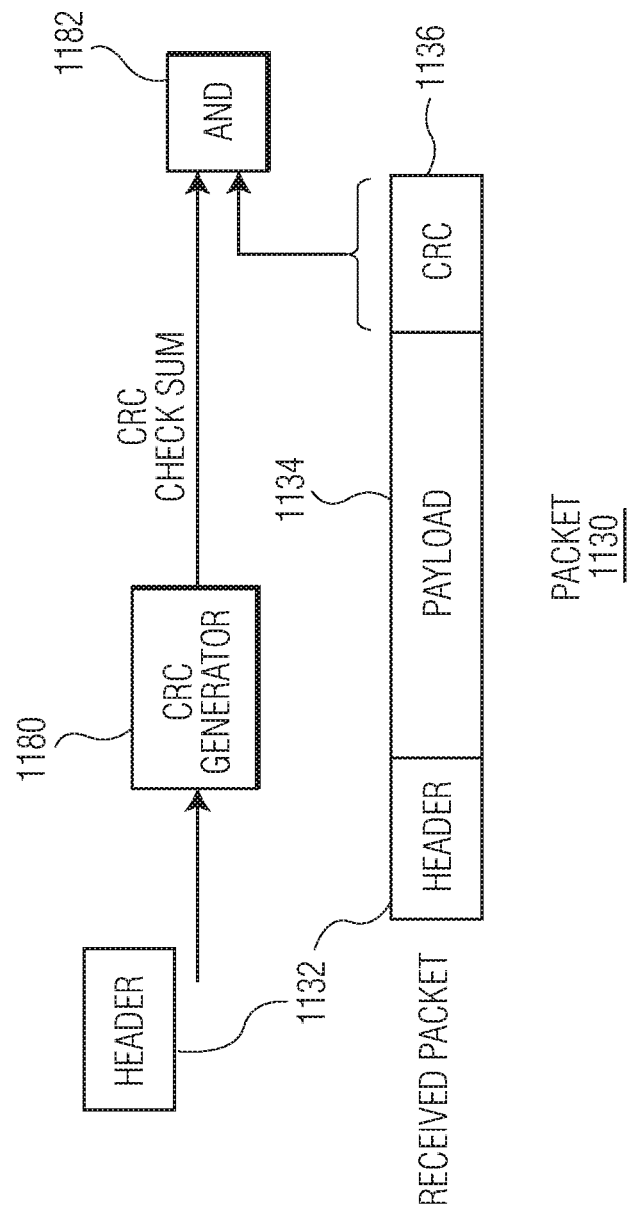
FIG. 11 illustrates a cyclic redundancy check (CRC) checking operation that can be performed at a receiving communications device for a packet having a CRC that is generated for a header of the packet only.

FIG. 11 illustrates a CRC checking operation that can be performed at a receiving communications device for a packet 1130 having a CRC 1136 that is generated for a header 1132 of the packet only. As illustrated in FIG. 11, for the packet having the CRC that is generated for the header of the packet only (not for the payload 1134 of the packet), the header 1132 is input into a CRC generator 1180, which produces a CRC checksum. The CRC checksum and the CRC of the packet are input into an AND logic 1182, which generates a CRC checking result that can be used to detect communications errors.

Figure 12:
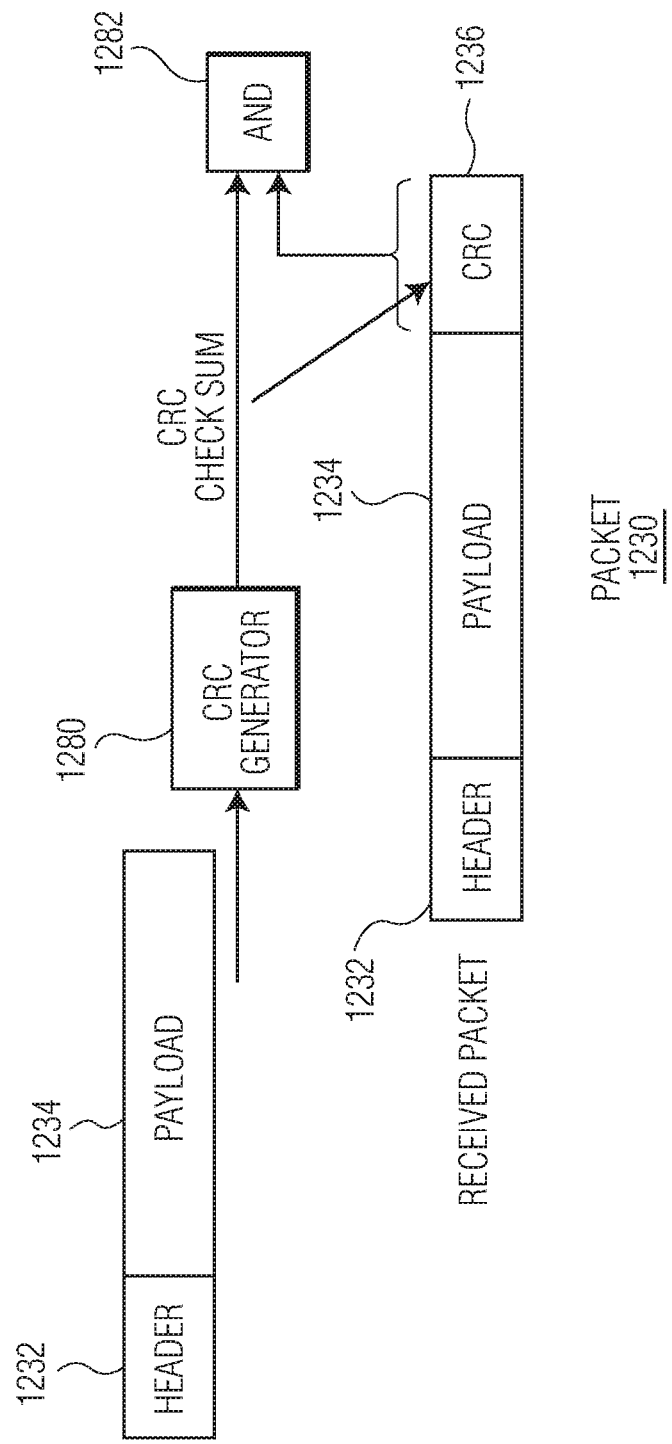
FIG. 12 illustrates a CRC checking operation that can be performed at a receiving communications device for a packet having a CRC that is generated for a header and a payload of the packet.

FIG. 12 illustrates a CRC checking operation that can be performed at a receiving communications device for a packet 1230 having a CRC 1236 that is generated for a header 1232 and a payload 1234 of the packet. As illustrated in FIG. 12, for the packet having the CRC that is generated for the header and the payload of the packet, the header 1232 is input into a CRC generator 1280, which produces a CRC checksum. The CRC checksum and the CRC of the packet are input into an AND logic 1282, which generates a CRC checking result that can be used to detect communications errors.

Figure 13:
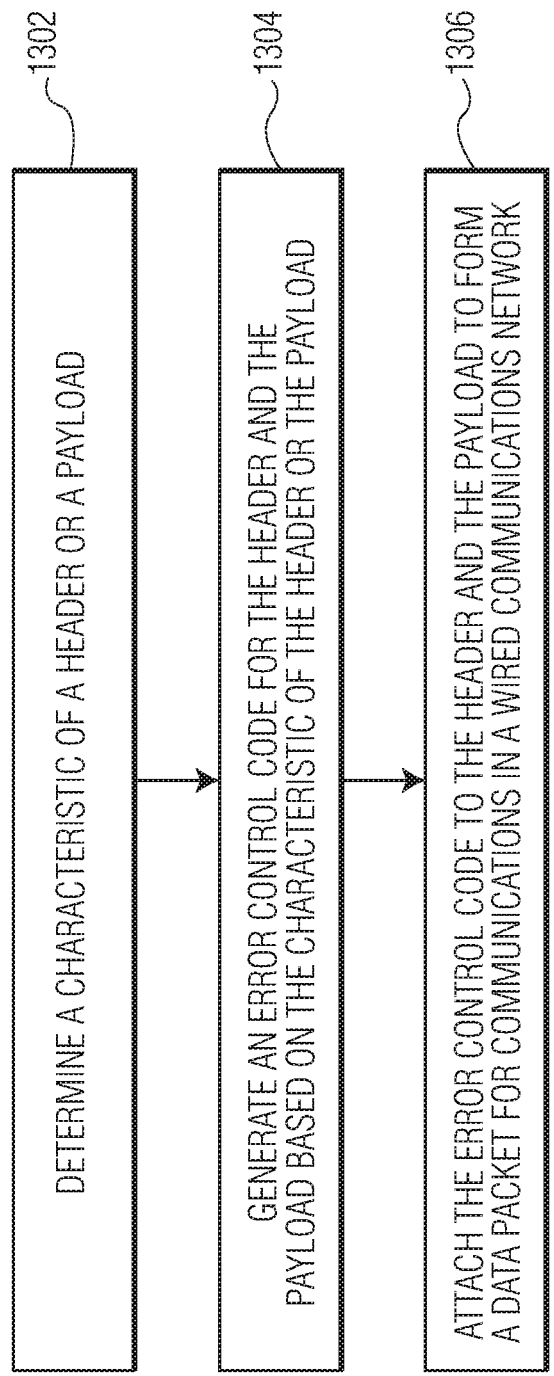
FIG. 13 is a process flow diagram of a method of communications in accordance to an embodiment of the invention.

FIG. 13 is a process flow diagram of a method of communications in accordance to an embodiment of the invention. According to the method, at block 1302, a characteristic of a header or a payload is determined. At block 1304, an error control code is generated for the header or for the header and the payload based on the characteristic of the header or the payload. At block 1306, the error control code is attached to the header and the payload to form a data packet for communications in a wired communications network. The wired communications network may be similar to, the same as, or a component of the communications network 100 depicted in FIG. 1 and/or the communications network 500 depicted in FIG. 5.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method of communications, the method comprising:
determining a characteristic of a header or a payload;
based on the characteristic, making a determination if an error control code needs to be generated for the header or for the header and the payload and generating an error control code for the header or for the header and the payload based on the making the determination; and
attaching the error control code to the header and the payload to form a data packet for communications in a wired communications network.

2. The method of claim 1, wherein the error control code comprises a cyclic redundancy check (CRC) code.

3. The method of claim 1, wherein the characteristic of the header or the payload comprises a communications protocol associated with the header or the payload.

4. The method of claim 3, wherein generating the error control code for the header or for the header and the payload based on the characteristic of the header or the payload comprises generating the error control code for the header when a first communications protocol is associated with the header or the payload.

5. The method of claim 4, wherein generating the error control code for the header or for the header and the payload based on the characteristic of the header or the payload comprises generating the error control code for the header and the payload when a second communications protocol that is different from the first communications protocol is associated with the header or the payload.

6. The method of claim 1, wherein the characteristic of the header or the payload comprises a size of the payload.

7. The method of claim 6, wherein generating the error control code for the header or for the header and the payload based on the characteristic of the header or the payload comprises generating the error control code for the header when the size of the payload is larger than a predefined threshold.

8. The method of claim 6, wherein generating the error control code for the header or for the header and the payload based on the characteristic of the header or the payload comprises generating the error control code for the header and the payload when the size of the payload is smaller than a predefined threshold.

9. The method of claim 1, wherein the header comprises information that indicates that the error control code is generated for the header or that the error control code is generated for the header and the payload.

10. The method of claim 9, wherein the information is stored in a data field of the header, and wherein the data field has a size of a single bit.

11. The method of claim 1, wherein the header further comprises protocol type information that indicates a communications protocol according to which the payload is encoded.

12. The method of claim 1, wherein the wired communications network is an in-vehicle network (IVN).

13. The method of claim 1, wherein the wired communications network is an asymmetrical communications network such that communications in a first direction of a network connection within the wired communications network occur at a first rate that is higher than a second rate at which communications in a second direction of the network connection occurs, and wherein the first direction is opposite to the second direction.

14. A communications device comprising:
a packet generation unit configured to:
determine a characteristic of a header or a payload;
based on the characteristic, to make a determination if an error control code needs to be generated for the header or for the header and the payload and generate an error control code based on the making the determination; and attach the error control code to the header and the payload to form a data packet for communications in a wired communications network; and a transmitter unit configured to transmit the data packet to the wired communications network.

15. The communications device of claim 14, wherein the error control code comprises a cyclic redundancy check (CRC) code.

16. The communications device of claim 14, wherein the characteristic of the header or the payload comprises a communications protocol associated with the header or the payload.

17. The communications device of claim 16, wherein the packet generation unit is further configured to generate the error control code for the header when a first communications protocol is associated with the header or the payload.

18. The communications device of claim 17, wherein the packet generation unit is further configured to generate the error control code for the header and the payload when a second communications protocol that is different from the first communications protocol is associated with the header or the payload.

19. The communications device of claim 14, wherein the characteristic of the header or the payload comprises a size of the payload, and wherein the packet generation unit is further configured to generate the error control code for the header when the size of the payload is larger than a predefined threshold.

20. A wired communications network comprising:
a wired transmission media; and
a plurality of communications devices configured to communicate via the wired transmission media, wherein each of the communications devices is configured to:
determine a characteristic of a header or a payload;
based on the characteristic, to make a determination if an error control code needs to be generated for the header or for the header and the payload and generate an error control code based on the making the determination; and
attach the error control code to the header and the payload to form a data packet for communications in the wired communications network.

* * * * *